(12) United States Patent
Deacon

(10) Patent No.: US 6,375,850 B1
(45) Date of Patent: Apr. 23, 2002

(54) METHOD FOR REMOVING METALS FROM A CLEANING SOLUTION

(75) Inventor: Lewis E. Deacon, Waverly, OH (US)

(73) Assignee: United States Enrichment Corp., Bethesda, MD (US)

(*) Notice: Subject to any disclaimer, the term of this patent is extended or adjusted under 35 U.S.C. 154(b) by 0 days.

(21) Appl. No.: 09/234,729

(22) Filed: Jan. 21, 1999

(51) Int. Cl.⁷ .................. B01D 15/04; B01D 21/01
(52) U.S. Cl. ............... 210/667; 210/669; 210/681; 210/688; 210/717; 210/724; 210/726; 210/912
(58) Field of Search .................. 134/10; 210/662, 210/665, 724, 739, 806, 667, 669, 681, 688, 717, 726, 912

(56) References Cited

U.S. PATENT DOCUMENTS 5,529,637 A * 6/1996 Frenier .................. 134/10

* cited by examiner

*Primary Examiner*—Ivars Cintins
(74) *Attorney, Agent, or Firm*—Townsend and Townsend and Crew

(57) ABSTRACT

A method for removing accumulated metals from a cleaning solution is provided. After removal of the metals, the cleaning solution can be discharged or recycled. The process manipulates the pH levels of the solution as a means of precipitating solids. Preferably a dual phase separation at two different pH levels is utilized.

12 Claims, 1 Drawing Sheet

METHOD FOR REMOVING METALS FROM A CLEANING SOLUTION

STATEMENT AS TO RIGHTS TO INVENTIONS MADE UNDER FEDERALLY SPONSORED RESEARCH AND DEVELOPMENT

The United States government has rights in this invention pursuant to Contract Number W-7405-ENG-48 between the United States Department of Energy and the University of California.

FIELD OF THE INVENTION

The present invention relates to cleaning processes of mixed metals and, more particularly, to an improved method for removing metals which accumulate in citric acid cleaning solutions thereby permitting the subsequent discharge or recycling of the liquid solution.

BACKGROUND OF THE INVENTION

Citric acid cleaning processes are used in a variety of applications. For example, such cleaning processes are typically employed in large degreasing and cleaning shops. Due to the corrosive effects of the citric acid, the cleaning solutions often contain large amounts of the metals being treated. In particular, soft metals such as iron and aluminum will collect in the solution.

Although citric acid cleaning techniques have been very successful over the years from a cleaning standpoint, the treatment of the cleaning solutions prior to disposal have proven to be quite problematic, primarily due to the difficulty in removing metals from the cleaning solution. For example, even after the metals in solution are rendered insoluble, some amount of the metals remains in a colloidal suspension. These suspended metals are exceedingly difficult to filter out of the solution. Additionally, the suspended metals tend to bind with the filter medium.

Methods for the removal of the metals from the citric acid cleaning solutions typically involve a one-step pH process. In this process the pH of the cleaning solution is adjusted to a pH of between 7.5 and 8.5 through the addition of a caustic such as NaOH. The solution is then stabilized and filtered. The efficiency of this approach is primarily driven by the composition of the cleaning solution, both in terms of the concentrations of the metals and the molarity of the citric acid.

What is needed in the art is a new method of removing metals from citric acid cleaning solutions that is more efficient than the prior techniques. The present invention provides such a process.

SUMMARY OF THE INVENTION

The process of the present invention repeatedly manipulates the pH of a cleaning solution, utilizing the corrosion products of iron and aluminum as flocculating agents to optimize the removal of other metals from the solution. Two separate precipitation/flocculation/filtration processes are performed at different pH levels.

The first step of the metals removal process is to adjust and stabilize the pH of the solution to approximately 11.5, preferably through the addition of sodium hydroxide. At this level of alkalinity, aluminum hydroxide is soluble while most other metals contained within the solution are insoluble. Insoluble iron hydroxide is formed, acting as a flocculant to optimize phase separation. After phase separation, the solution is filtered and the filtrate is collected.

The pH of the filtrate is then reduced to approximately 8.0, preferably through the addition of nitric acid. At this pH aluminum hydroxide becomes insoluble and acts as a second flocculant. A second filtration step is then performed, the remaining filtrate having a greatly reduced concentration of metals.

In at least one embodiment of the invention, after the two-step pH adjustment/filtration process, an additional step is performed in which the filtrate is subjected to an ion exchange resin. Preferably a cationic exchange resin such as Purolite S-940 or S-950 is used. More preferably Purolite S-950 converted to a $H^+$ form is used.

In at least one other embodiment of the invention, the cleaning solution is initially tested to determine the citric acid concentration. If the citric acid concentration is determined to be greater than or equal to 0.01 Molar, the two-step process of the invention is used. Alternately, if the citric acid concentration is determined to be less than 0.01 Molar, a one-step process is used in which the pH of the solution is adjusted and stabilized to between 7.5 and 8.5 and then the solution is filtered.

A further understanding of the nature and advantages of the present invention may be realized by reference to the remaining portions of the specification and the drawings.

DESCRIPTION OF THE SPECIFIC EMBODIMENTS

Figure 1:
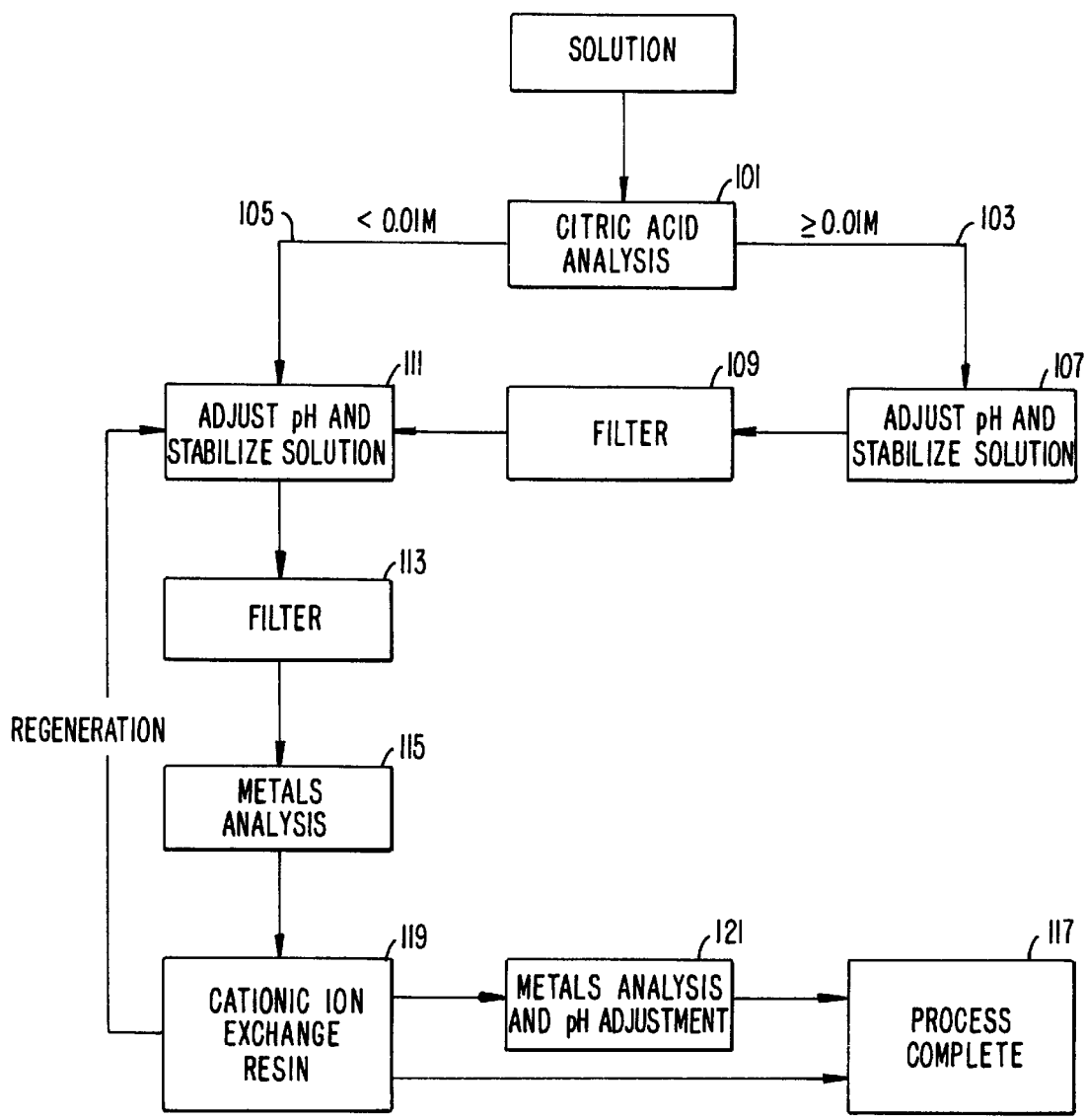
FIG. 1 schematically illustrates the process according to the preferred embodiment of the invention.

The heavy metals removal process (i.e., HMRP) that is commonly used to remove metals from cleaning solutions has been in use for many years. Since its development there have been many changes in the chemical composition of the solutions to be treated. The most significant changes are the result of the new cleaners that have replaced the chemicals used for removing surface contaminants. Although these new cleaners are typically more effective than the chemicals that they have replaced, they are unfortunately more difficult to treat prior to disposal. Using the standard HMRP, metal concentrations in the filtrate often exceed acceptable levels. Preferably after treatment the cleaning solutions should contain less than 1 part per million (ppm) or 1 milligram per liter (mg/L) of copper, nickel, uranium, aluminum, iron, and zinc, thus allowing proper waste disposal.

In order to determine the source of the standard HMRP technique's ineffectiveness, studies were conducted on waste surrogates containing the metal concentrations shown in Table I. It was presumed that the cause of failure for the HMRP technique was related to the chelation effects of the decontamination cleaners as well as the citric acid concentration. Chelation effects are well understood by those of skill in the art and are related to chelate ring formation. Typically chelating agents reduce the chemical activity of metal ions.

TABLE I

| Metal | Concentration (mg/L) |
| --- | --- |
| Aluminum | 1000 |
| Copper | 1000 |
| Iron | 1000 |

TABLE I-continued

| Metal | Concentration (mg/L) |
|---|---|
| Nickel | 1000 |
| Zinc | 500 |
| Uranium | 50 |

Based on the study of the waste surrogate, it was determined that in general, solutions containing less than 0.01 molar citric acid could be successfully treated with the standard HMRP technique while solutions containing greater than this molar concentration could not be successfully treated. The exact point at which the standard treatment process is no longer effective depends not only on the molar concentration of the citric acid, but also on the concentration of nitric acid contained within the waste.

Since the waste solutions of primary interest typically contain large concentrations of both iron and aluminum, a treatment approach was chosen in which the hydroxides of the two metals could be used individually as coagulants. In the selected approach, the pH is increased by the addition of a caustic (e.g., NaOH), resulting in both metal hydroxides becoming insoluble and existing as suspended solids. Once the pH is increased to greater than 10, aluminum hydroxide becomes soluble while most other metals contained in the solution remain insoluble. At a pH of about 11.5, iron hydroxide is used to coagulate and co-precipitate insoluble metals. After phase separation by filtration, nitric acid is added to reduce the filtrate to a pH of about 8.0. At this level, aluminum hydroxide is insoluble and is used to coagulate and co-precipitate the remainder of the insoluble metals. Filtration is repeated and a polished filtrate results.

The two-step pH method outlined above was used to treat a sample of a cleaning solution with an unknown citric acid content but with demonstrated chelating characteristics. Nitric acid was present at the concentration of about 30 percent (i.e., approximately 4.5 Normal). Table II shows the results of a comparison between the standard HMRP technique and the two-step approach outlined above. Also shown in Table II are the concentrations of the six primary target metals indicated in Table I prior to the use of either metal removal process. All of the concentrations are given in mg/L. As indicated by the results, the two-step approach of the present invention provided significant improvements on metal removal for all of the tested metals except aluminum.

TABLE II

| | Al | Cu | Fe | Ni | Zn | U |
|---|---|---|---|---|---|---|
| Sample | 3088 | 1076 | 4880 | 616 | 372 | 40.7 |
| HMRP | 18.9 | 13.3 | 0.889 | 1.48 | 0.356 | 1.94 |
| 2-Step | 27.1 | 0.638 | 0.186 | 0.137 | 0.034 | 0.391 |

The two-step process was also tested to determine its ability to remove three other metals; lead, cadmium, and chromium. Prior to using the process, the concentrations of these metals in the solution were 244.8 mg/L, 67.2 mg/L, and 50.0 mg/L, respectively. After processing, the concentrations were 0.009 mg/L of cadmium and 0.155 mg/L of chromium. The concentration of lead after processing was undetectable.

A second test of the two-step approach of the present invention was performed in which the citric acid concentration was known. Specifically, the surrogate sample had a 0.01 Molar concentration of citric acid. Nitric acid was added at 30 weight percent. The results of this test are provided in Table III in which all concentrations are provided in mg/L.

TABLE III

| | Al | Cu | Fe | Ni | Zn | U |
|---|---|---|---|---|---|---|
| Sample | 1050 | 1060.00 | 1100 | 1110 | 551 | 38.5 |
| HMRP | 27.2 | 7.81 | <0.018 | 0.129 | 0.066 | 3.44 |
| 2-Step | 55.7 | 1.44 | <0.018 | 0.034 | 0.265 | 2.24 |

As in the previous test, the two-step approach proved to be a more effective metal removal technique for all of the metals of interest except aluminum. Additionally, a comparison of the test data indicated that increasing the nitric acid to 30 percent had an adverse effect on metals removal but demonstrated that the two-step pH process would marginally overcome the effect at 0.01 molar citric acid. It farther confirmed the need to hold the citric acid to less than this molar concentration for the HMRP treatment to be marginally effective.

Additional tests were performed to observe the effects of an increase in citric acid concentration. Comparisons were made between the standard HMRP technique and the two-step pH process of the current invention at molar concentrations of citric acid of 0.015 and 0.018. The results of these tests are provided in Table IV in which the metals concentration units are mg/L.

TABLE IV

| Citric | Process | Al | Cu | Fe | Ni | Zn | U |
|---|---|---|---|---|---|---|---|
| 0.015 M | HMRP | 38 | 63.5 | 0.898 | 1.93 | 1.87 | 14.4 |
| 0.015 M | 2-Step | 454 | 8.12 | 0.380 | 0.416 | 2.13 | 9.52 |
| 0.018 M | HMRP | 19.5 | 81.8 | 2.61 | 2.69 | 1.79 | 19.0 |
| 0.018 M | 2-Step | 488 | 9.72 | 0.080 | 0.098 | 1.92 | 7.95 |

Several conclusions were reached after reviewing the test results shown in Table IV. First, the two-step approach was more effective in removing copper, iron, nickel, and uranium. The standard HMRP technique, however, was slightly more effective in removing zinc and much more effective in removing aluminum. Second, although the two-step technique was generally more effective than the standard HMRP, the concentrations of several of the metals was still higher than the desired concentrations.

Attempts to lower the metal concentration included diluting the solution by 50 percent and reducing the caustic concentration from 50 percent to 25 percent. These methods had no apparent effect except that reducing the caustic concentration allowed better pH control.

In another approach, the solution was heating, simulating the heating that might occur as the volume is reduced in a pre-evaporator. This approach did not produce any significant reductions of metals concentrations although it did lead to an observation that the heat generated as caustic increased the solution pH to 11, thereby improving metals removal. For this approach the temperature was increased from an ambient temperature of 22° C. to between 65° and 68° C.

An approach that can be successfully used in conjunction with the two-step process to further reduce the concentration of metals is ion exchange resin. Preferably hydroxide precipitation and filtration is used to remove the bulk of the metals followed by polishing of the filtrate with cationic ion exchange resin to attain the desired low concentrations.

There are a variety of cationic ion exchange resins that can be used for this purpose. Purolite S-940 chelating resin has been tested and shown to successfully remove uranium from waste. Purolite S-950 resin is similar to S-940 but with more total exchange capacity. This resin is a macroporous aminophosphonic acid resin developed for the removal of chelated metals from aqueous solutions. A chelating resin is desirable since the chelating characteristic overcomes the chelant in the solution holding metals soluble, thus allowing the attachment of the metals to functional groups of the resin. The affinity order for metals varies with pH so that in an acidic solution the resin would have a strong attraction for ionic $Fe^{3+}$, $Cu^{2+}$, $Zn^{2+}$, $Al^{3+}$, and $Ni^{2+}$. Since the pH was slightly above neutral to allow effective hydroxide metals removal, initial testing was performed using sodium ion exchange resin.

To test the use of ion exchange resin in combination with the two-step process, batch testing was used to reduce processing time. This method is usually less effective than column testing which indicates more conservative data. In the initial ion exchange tests, a volume of surrogate solution containing 0.024 molar citric acid and 3 percent nitric acid was processed with the two-step method and the filtrate collected for resin tests. This filtrate had a pH of 7.8. One hundred milliliters of this filtrate were treated with 25 grams of S-950 resin. After treatment with the resin the pH of this solution increased to 9.8 where the resin has less affinity for the target metals. Resin and solution were stirred slowly for one hour and samples removed. Initial testing did not result in the desired level of metals removal.

In order to improve upon the removal of metals, a 25 gram quantity of S-950 resin was converted from $Na^+$ to $H^+$ form ion exchange by treating it with dilute 10 percent nitric acid followed by a deionized water rinse. The solution was then treated again and found to have a pH of 2.1, a very desirable level for copper removal. A duplicate test was performed in which the final pH was 2.2. Table V shows the results of these tests. Included in Table V are the concentrations of the metals of interest (in mg/L) determined after the two-step filtration process ("filtrate") as well as for both resin tests.

TABLE V

| Sample | Al | Cu | Fe | Ni | Zn | U |
| --- | --- | --- | --- | --- | --- | --- |
| Filtrate | 417 | 84.4 | 0.65 | 2.04 | 0.88 | 11.1 |
| Resin Test #1 | 1.01 | 1.36 | 0.03 | 0.29 | 0.08 | 0.002 |
| Resin Test #2 | 1.30 | 1.41 | 0.11 | 0.27 | 0.05 | 0.002 |

Another test was performed to verify that a chelating resin was needed since a normal cationic resin is less expensive and therefore more desirable. Accordingly, surrogate solution containing 0.024 molar citric acid and 10 percent nitric acid were treated with the two-step process. Utilizing batch treatment, a 100 milliliters of collected filtrate was then added to 25 grams of Purolite C-106 converted to the $H^+$ ionic form and stirred for one hour. The same procedure was also used with the S-950 chelating resin. Table VI show the results of a comparison between the two resins, the concentrations given in units of mg/L. The results of this test indicate the need for the chelating resin.

TABLE VI

| Sample | Al | Cu | Fe | Ni | Zn | U |
| --- | --- | --- | --- | --- | --- | --- |
| Filtrate | 510 | 60.8 | 0.6 | 4.49 | 80.1 | 30.4 |
| C-106 | 96.5 | 13.8 | 0.159 | 0.286 | 47.0 | 3.03 |
| S-950 | 1.18 | 0.793 | <0.005 | 0.031 | 1.27 | 0.004 |

Another chelating resin, S-930, that reportedly has a stronger affinity for copper than S-950 was also tested. S-930 is also a polystyrene resin but substituted with iminodiacetic groups. Filtrate was generated from surrogate solution using the two-step pH process of the invention. S-930 resin was converted to the $H^+$ ionic form as with the S-950 resin. Two tests using S-930 were performed as well as a comparison test using S-950, all three tests using the previously described method. The results provided in Table VII indicate that while the S-930 resin is slightly more effective in removing copper than the S-950 resin, it is dramatically less effective in the removal of aluminum. As in the previous tables, the concentrations are given in mg/L.

TABLE VII

| Sample | Al | Cu | Fe | Ni | Zn | U |
| --- | --- | --- | --- | --- | --- | --- |
| Filtrate | 678 | 43.4 | 0.603 | 1.47 | 2.87 | 15.8 |
| S-930 | 282 | 0.197 | 0.323 | 0.071 | 0.134 | 0.749 |
| S-930 | 278 | 0.155 | 0.207 | 0.013 | 0.124 | 0.628 |
| S-950 | 5.44 | 0.297 | 0.007 | 0.089 | 0.142 | 0.004 |

Another test was performed to determine if the two-step pH treatment followed by the S-950 resin polishing technique could overcome the chelating effects of 0.3 molar citric acid on a typical surrogate solution. Duplicate tests were performed as in previous testing. The results of the polished solution indicate that several ion exchange columns would probably be required. The concentration data in Table VIII is given in mg/L.

TABLE VIII

| Sample | Al | Cu | Fe | Ni | Zn | U |
| --- | --- | --- | --- | --- | --- | --- |
| Filtrate | 393 | 237 | 2.0 | 7.5 | 2.9 | 22.7 |
| S-950 | 22.9 | 20.8 | 0.053 | 4.22 | 0.299 | 0.022 |
| S-950 | 15.9 | 16.0 | 0.035 | 4.60 | 0.244 | 0.009 |

As indicated above, the two-step pH process of the present invention offers dramatic improvements in metals removal over the standard HMRP method. In particular, the two-step process has been shown to overcome the chelating effects of citric acid. Although only the effects of citric acid were tested, the process, by design, should effectively remove metals from other aqueous chelating solutions.

The process of the present invention is best served by applying it to solutions containing maximum concentrations of about 0.024 molar citric acid and 30 weight percent nitric acid. For polishing the filtrate and further reducing the concentration of metals within the solution, Purolite S-950 ion exchange resin is the recommended resin, either as received or converted to the $H^+$ form.

FIG. 1 schematically illustrates the process according to the preferred embodiment of the invention. This process can be modified as noted above and as described in relation to the figure depending upon the desired level of metal reduction.

The function of the illustrated process is to overcome the chelating effects of the citric acid concentration and/or to meet metals concentration targets (e.g., 1 mg/L of nickel). Preferably the process includes two decision-making steps, thus making the procedure both efficient and cost effective. Alternately, the same process can be used repeatedly for every batch of solution to undergo processing.

According to the preferred embodiment of the invention, the solution to be cleaned is first analyzed to determine the citric acid concentration (step 101). If the citric acid concentration is found to be greater than or equal to 0.01 Molar (step 103), then the two-step process of the present invention is used. If the concentration is found to be less than 0.01 Molar (step 105), only a one step process is required.

As illustrated, if it is determined that the citric acid concentration is too great, the pH of the solution is adjusted so that it is in the range of approximately 11.0 to 11.5 (step 107). As disclosed above, the pH can be adjusted by adding a caustic to the solution. Once the pH is adjusted, the solution is stabilized maintaining the pH in the desired range. Preferably the pH is adjusted using 50 weight percent NaOH, thus generating beneficial heat. The solution is then filtered to remove unwanted metals (step 109).

After filtering step 109, the pH of the solution is again adjusted and the solution stabilized (step 111). Note that if the results of concentration analysis step 101 indicates a concentration of less than 0.01 Molar, the pH of the solution is immediately adjusted in accordance with step 111, skipping steps 107 and 109. In step 111, the pH of the solution is adjusted and stabilized within the range of about 7.5 to about 8.5, preferably using nitric acid. The solution is then filtered again (step 113) further removing unwanted metals.

Depending upon the concentration targets as well as the desired application, the metal removal process can be considered to be complete after step 113. Preferably the filtrate is analyzed (step 115) to determine if the metals concentrations of the filtrate are within the desired levels. If the desired concentration levels have been met, the process is complete (step 117). It is understood that the concentration criteria set out in this specification (i.e., less that 1 ppm of six metals) is for illustrative purposes only as the present invention is applicable to other concentration levels and other metals.

If the metals analysis determines that the concentrations do not meet the target criteria, then the solution is sent to the cationic ion exchange resin in the $H^+$ form (step 119). After processing through the cationic resin, the process is complete. Alternately, the solution from the cationic resin may be collected in a holding tank for metals analysis and pH adjustment (step 121).

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of removing metals from a citric acid cleaning solution, the method comprising the steps of:
    adjusting a pH associated with said cleaning solution to a range of about 11.0 to about 11.5;
    filtering said cleaning solution;
    adjusting said pH to be within a range of about 7.5 to about 8.5; and
    filtering said cleaning solution.

2. The method of claim 1, wherein said adjusted pH in said first mentioned adjusting step is about 11.5.

3. The method of claim 1, further comprising the step of stabilizing said pH of said cleaning solution after said first adjusting step, wherein said stabilized pH is in the range of about 11.0 to about 11.5.

4. The method of claim 1, said first adjusting step further comprising the step of adding a caustic to said cleaning solution.

5. The method of claim 4, wherein said caustic is sodium hydroxide.

6. The method of claim 1, said second adjusting step further comprising the step of adding nitric acid to said cleaning solution.

7. A method of removing metals from a citric acid cleaning solution, the method comprising the steps of:
    adjusting a pH associated with said cleaning solution to a range of about 11.0 to about 11.5;
    filtering said cleaning solution;
    adjusting said pH to be within a range of about 7.5 to about 8.5;
    filtering said cleaning solution;
    collecting a filtrate after said second filtering step; and
    polishing said filtrate with a cationic ion exchange resin.

8. The method of claim 7, wherein said cationic ion exchange resin is a chelating resin.

9. The method of claim 7, further comprising the step of converting said cationic ion exchange resin from a $Na^+$ form to a $H^+$ form.

10. The method of claim 7, further comprising the steps of treating said cationic ion exchange resin with dilute nitric acid and rinsing said treated cationic ion exchange resin with deionized water.

11. A method of removing metals from a citric acid cleaning solution, the method comprising the steps of:
    adjusting a pH associated with said cleaning solution to about 11.5;
    filtering said cleaning solution;
    adjusting said pH to be about 8.0; and
    filtering said cleaning solution.

12. A method of removing metals from a citric acid cleaning solution, the method comprising the steps of:
    adjusting a pH associated with said cleaning solution to about 11.5;
    filtering said cleaning solution;
    adjusting said pH to be within a range of about 7.5 to about 8.5;
    filtering said cleaning solution; and
    stabilizing said pH of said cleaning solution after said second adjusting step, wherein said stabilized pH is about 8.0.

* * * * *

UNITED STATES PATENT AND TRADEMARK OFFICE
CERTIFICATE OF CORRECTION

PATENT NO.    : 6,375,850 B1                                    Page 1 of 1
DATED         : April 23, 2002
INVENTOR(S)   : Lewis E. Deacon It is certified that error appears in the above-identified patent and that said Letters Patent is hereby corrected as shown below:

Column 1,
Lines 3-10, are deleted.

Signed and Sealed this

Twenty-fourth Day of February, 2004

JON W. DUDAS
*Acting Director of the United States Patent and Trademark Office*